(12) United States Patent
Anttila et al.

(10) Patent No.: US 7,447,513 B2
(45) Date of Patent: Nov. 4, 2008

(54) SYSTEM AND ASSOCIATED TERMINAL AND METHOD FOR SHORT-RANGE INITIATION OF JOINING AND/OR TRANSFERRING A COMMUNICATION SESSION

(75) Inventors: Akseli Anttila, Helsinki (FI); Younghee Jung, Helsinki (FI)

(73) Assignee: Nokia Corporation, Espoo (FI)

( * ) Notice: Subject to any disclaimer, the term of this patent is extended or adjusted under 35 U.S.C. 154(b) by 656 days.

(21) Appl. No.: 10/924,316

(22) Filed: Aug. 23, 2004

(65) Prior Publication Data

US 2006/0040692 A1 Feb. 23, 2006

(51) Int. Cl.
*H04B 7/00* (2006.01)
*H04Q 7/20* (2006.01)

(52) U.S. Cl. ............... 455/519; 455/41.1; 455/41.2; 455/518; 455/415; 455/416; 379/202.01; 379/207.01

(58) Field of Classification Search ............ 455/518, 455/519, 41.1, 41.2, 436, 422.1, 415–417, 455/414.1, 445, 552.1, 408, 465; 379/207.01, 379/210, 211.01, 212.01, 144, 220.01, 211.02, 379/88.16, 114.02, 114.01, 202.01, 220

See application file for complete search history.

(56) References Cited

U.S. PATENT DOCUMENTS

| 5,390,233 | A | | 2/1995 | Jensen et al. |
| 5,654,961 | A | * | 8/1997 | Araujo et al. ............ 370/263 |
| 5,854,977 | A | | 12/1998 | Oksanen et al. |
| 6,026,154 | A | * | 2/2000 | Nabeta et al. ............ 379/202.01 |
| 6,269,159 | B1 | * | 7/2001 | Cannon et al. .......... 379/202.01 |
| 6,405,027 | B1 | | 6/2002 | Bell |
| 6,611,673 | B1 | | 8/2003 | Bayley et al. |
| 6,816,469 | B1 | * | 11/2004 | Kung et al. ............. 370/260 |
| 7,236,773 | B2 | | 6/2007 | Thomas |
| 7,251,319 | B2 | * | 7/2007 | Celi et al. .............. 379/202.01 |
| 2003/0022671 | A1 | | 1/2003 | Huomo et al. |
| 2003/0044654 | A1 | | 3/2003 | Holt |
| 2003/0129997 | A1 | * | 7/2003 | Steinbach et al. .......... 455/465 |
| 2003/0138080 | A1 | * | 7/2003 | Nelson et al. ............ 379/88.16 |
| 2003/0156698 | A1 | * | 8/2003 | Creamer et al. .......... 379/207.01 |
| 2004/0034723 | A1 | | 2/2004 | Giroti |
| 2004/0196867 | A1 | * | 10/2004 | Ejzak et al. ............... 370/468 |
| 2005/0068154 | A1 | * | 3/2005 | Beste et al. ................ 340/7.2 |
| 2005/0207361 | A1 | * | 9/2005 | Rosenberg et al. .......... 370/282 |

FOREIGN PATENT DOCUMENTS

EP 1 161 114 A2 12/2001

(Continued)

*Primary Examiner*—Sujatha Sharma
(74) *Attorney, Agent, or Firm*—Alston & Bird LLP

(57) ABSTRACT

A system is provided that includes a first terminal, and a second terminal engaged in a communication session with the first terminal across one or more networks. The system also includes a third terminal capable of communicating with the second terminal across a short-range communication link between with the second terminal. The second terminal or the third terminal is capable of receiving an identifier of the third terminal or the second terminal, respectively, across the short-range communication link. Thereafter, the terminal receiving the identifier is capable of communicating with the communication network(s) based upon the identifier to thereby join the third terminal in the communication session between the first and second terminals.

40 Claims, 7 Drawing Sheets

FOREIGN PATENT DOCUMENTS

| | | | |
|---|---|---|---|
| GB | 2369960 A * | 6/2002 | |
| WO | WO9748233 * | 6/1996 | |
| WO | WO 01/43351 A2 | 6/2001 | |
| WO | WO 01/43459 A2 | 6/2001 | |
| WO | WO 03053089 A1 | 6/2003 | |
| WO | WO 03054574 A1 | 7/2003 | |
| WO | WO 2006/038200 A1 | 4/2006 | |

* cited by examiner

SYSTEM AND ASSOCIATED TERMINAL AND METHOD FOR SHORT-RANGE INITIATION OF JOINING AND/OR TRANSFERRING A COMMUNICATION SESSION

FIELD OF THE INVENTION

The present invention generally relates to wireless communication and, more particularly, to systems and associated terminals and methods for initiating the transfer or conferencing of a voice communication session via short-range communication.

BACKGROUND OF THE INVENTION

Where mobile telephones were perhaps viewed by many as a luxury when first introduced into the marketplace, they are today viewed by our society as very important, convenient, and useful tools. A great number of people now carry their mobile devices with them wherever they go. This popularity of wireless communication has spawned a multitude of new wireless systems, devices, protocols, etc. Consumer demand for advanced wireless functions and capabilities has also fueled a wide range of technological advances in the utility and capabilities of wireless devices. Wireless/mobile devices not only allow audio communication, but also facilitate messaging, multimedia communications, e-mail, Internet browsing, and access to a wide range of wireless applications and services.

Although an incredible amount of content, applications, services, and the like is already available for use on wireless devices, current services do not provide a user-friendly technique for establishing a conference call or transferring a call from one mobile telephone to another. In this regard, consider the scenario where a first mobile user is involved in a current telephone call with a second mobile user, and a third mobile user, who is located proximate the second mobile user, desires to speak with the first mobile user during the telephone call. In such an instance, the third mobile user can speak with the first mobile user by using the second mobile user's mobile telephone. Alternatively, the second mobile user can initiate a speakerphone feature (if so equipped) to permit the third mobile user to speak with the first mobile user. In another alternative, the second mobile user can conference the third mobile user into the telephone call, or transfer the telephone call to the third mobile user.

Whereas current techniques for permitting the third mobile user to join a telephone call between the first and second mobile users are adequate in permitting the third mobile user to speak with the first mobile user, such techniques have drawbacks. In this regard, as the number of features of mobile telephones increases, the second mobile user may desire to transfer a telephone call to the third mobile user, and thereafter use the second mobile user's telephone for another purpose even though when they are not talking on the phone (i.e., a user may want to still use their own phone for other communicative reasons after transferring the call to the other user). In such instances, the second mobile user may find it undesirable to allow the third mobile user to use the second mobile user's telephone, particularly if the second mobile user does not trust the third mobile user, and/or the second mobile user's telephone is storing sensitive information.

Using a speakerphone feature of the second mobile user's telephone may not require the second mobile user to allow the third mobile user to use the second mobile user's telephone. However, the voice quality of such speakerphone features is typically much less than a headset, and rapidly diminishes the farther the users are from the telephone. Conferencing the third mobile user into the telephone call, or transferring the telephone call to the third mobile user, may permit the second and/or third mobile users to communicate with the first mobile user without diminished voice quality. Conventional conferencing and transferring techniques, however, typically require many inconvenient and non-user-friendly interactions with one or more of the mobile telephones and/or the network across which the mobile telephones communicate.

SUMMARY OF THE INVENTION

In light of the foregoing background, embodiments of the present invention provide an improved system and associated terminal, method and computer program product for joining a terminal in a communication session or transferring one end of a communication session to the terminal, where joining or transferring the communication session is initiated by short-range communication. In contrast to conventional techniques, by joining a communication session or transferring into a communication session between first and second terminals, embodiments of the present invention permit a third terminal to communicate with the first terminal without requiring the third terminal user to borrow the second terminal from the second terminal user, and without requiring a speakerphone feature of the second terminal. Also, in contrast to conventional conferencing techniques, embodiments of the present invention initiate joining a communication session or transferring into a communication session by means of short-range communication between the second and third terminals. As such, embodiments of the present invention can join the third terminal in a communication session or transfer the communication session to the third terminal without requiring inconvenient and non-user-friendly interactions with one or more of the terminals and/or the network across which the terminals communicate.

According to one aspect of the present invention, a system is provided that includes a first terminal and a second terminal engaged in a communication session with the first terminal across one or more communication networks. The system also includes a third terminal capable of communicating with the second terminal across a short-range communication link (e.g., radio frequency (RF) communication link) between with the second terminal. The second terminal or the third terminal is capable of receiving an identifier of the other of the second terminal and the third terminal across the short-range communication link. For example, the second or third terminal can be capable of receiving an identifier capable of uniquely identifying the other of the second or third terminals to at least one of the communication networks. Alternatively, the second terminal or the third terminal can be capable of receiving an identifier of the communication session between the first terminal and the second terminal.

Thereafter, the terminal receiving the identifier is capable of communicating with the communication network(s) based upon the identifier to thereby join the third terminal in the communication session between the first and second terminals. In this regard, the terminal receiving the identifier can be pre-configured to perform an action. Alternatively, the terminal receiving the identifier can be further capable of receiving an action to perform with respect to the identifier, the action having been dynamically-configured by the terminal transmitting the identifier. In either event, the terminal receiving the identifier can be capable of communicating with the communication network(s) in accordance with the action.

More particularly, the third terminal can be capable of receiving the second terminal identifier, and thereafter communicating the second terminal identifier to the communication network(s) to thereby join the third terminal in the communication session between the first and second terminals. In such an instance, the third terminal can be further capable of receiving an identifier of the first terminal. Then, the third terminal can be capable of communicating the identifiers of the first and second terminals to the communication network(s) to thereby join the third terminal in the communication session between the first and second terminals.

The second terminal can be capable of communicating with the third terminal across a first short-range communication link (e.g., Bluetooth communication link) between the second and third terminals. The second terminal or the third terminal can then be capable of receiving at least one parameter to establish a second short-range communication link (e.g., RF communication link) between the second and third terminals, where the parameter(s) are received across the first short-range communication link. The second terminal or the third terminal can then be capable of establishing a second short-range communication link between the second and third terminals based upon the parameter(s). Thereafter, the second terminal or the third terminal can be capable of receiving the identifier of the other of the second terminal and the third terminal across the second short-range communication link.

In lieu of joining the third terminal in the communication session between the first and second terminals, the third terminal can be capable of transferring into the communication session. In such an instance, the third terminal can be capable of receiving an identifier of the first terminal, the first terminal identifier being received from the second terminal across the short-range communication link. Then, the third terminal can be capable of communicating the first terminal identifier to the communication network(s) to thereby transfer the communication session from the second terminal to the third terminal.

Further, the second terminal can be capable of interconnecting the first and third terminals during the communication session between the first and second terminals, although the third terminal can otherwise be capable of engaging the first terminal in a communication session independent of the second terminal. In this instance, the third terminal can be capable of establishing a short-range communication link with the second terminal. Then, when the second terminal receives communication from the first terminal across the communication network(s), the third terminal can be capable of receiving the communication from the second terminal across the short-range communication link. Likewise, the third terminal can be capable of sending communication to the second terminal across the short-range communication link such that the second terminal can thereafter send the communication to the first terminal across the communication network(s).

According to other aspects of the present invention, a terminal, method and computer program product are provided for joining a terminal in a communication session or transferring one end of a communication session to the terminal. In this regard, joining a third terminal in a communication session between a first terminal and a second terminal across one or more communication networks, or transferring the terminal into the communication session, can be initiated with the third terminal and the second terminal establishing a short-range communication link. Across the short-range communication link, then, the second and third terminals can exchange one or more parameters such that the second or the third terminal can communicate with the communication networks to thereby join the third terminal in the communication session between the first and second terminals, or transfer the communication session from the second terminal to the third terminal. Alternatively, the second and third terminals can establish a short-range communication link such that communication during the communication session can be transferred from the second terminal to the third terminal. Therefore, the system, and associated terminal, method and computer program product of embodiments of the present invention solve the problems identified by prior techniques and provide additional advantages.

BRIEF DESCRIPTION OF THE DRAWINGS

Figure 1:
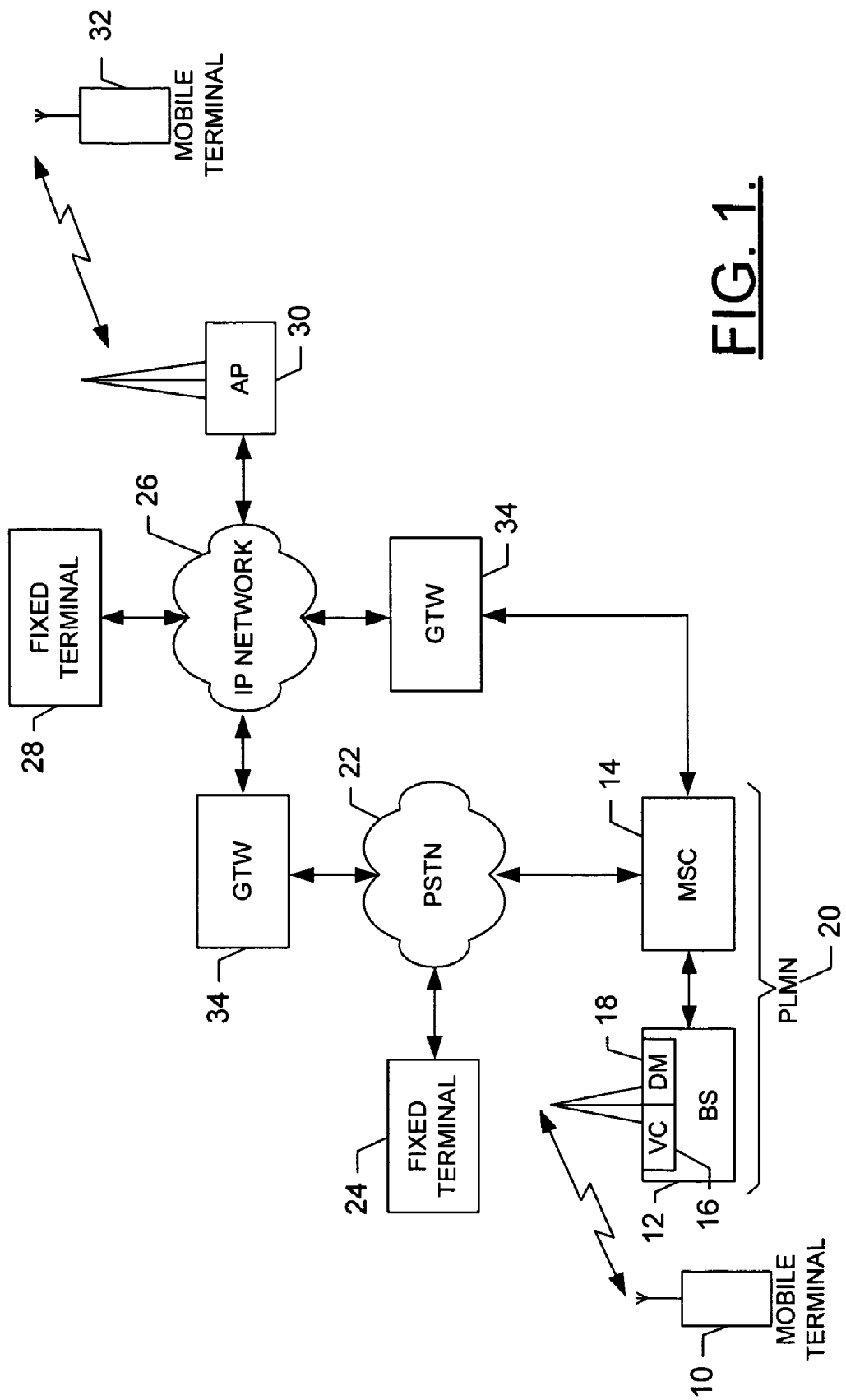
Figure 2:
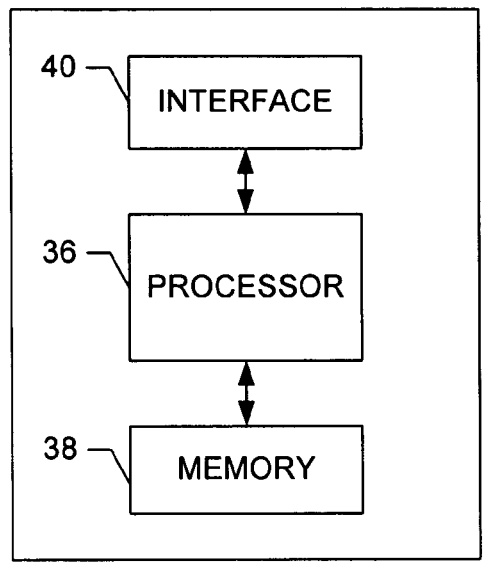
Figure 3:
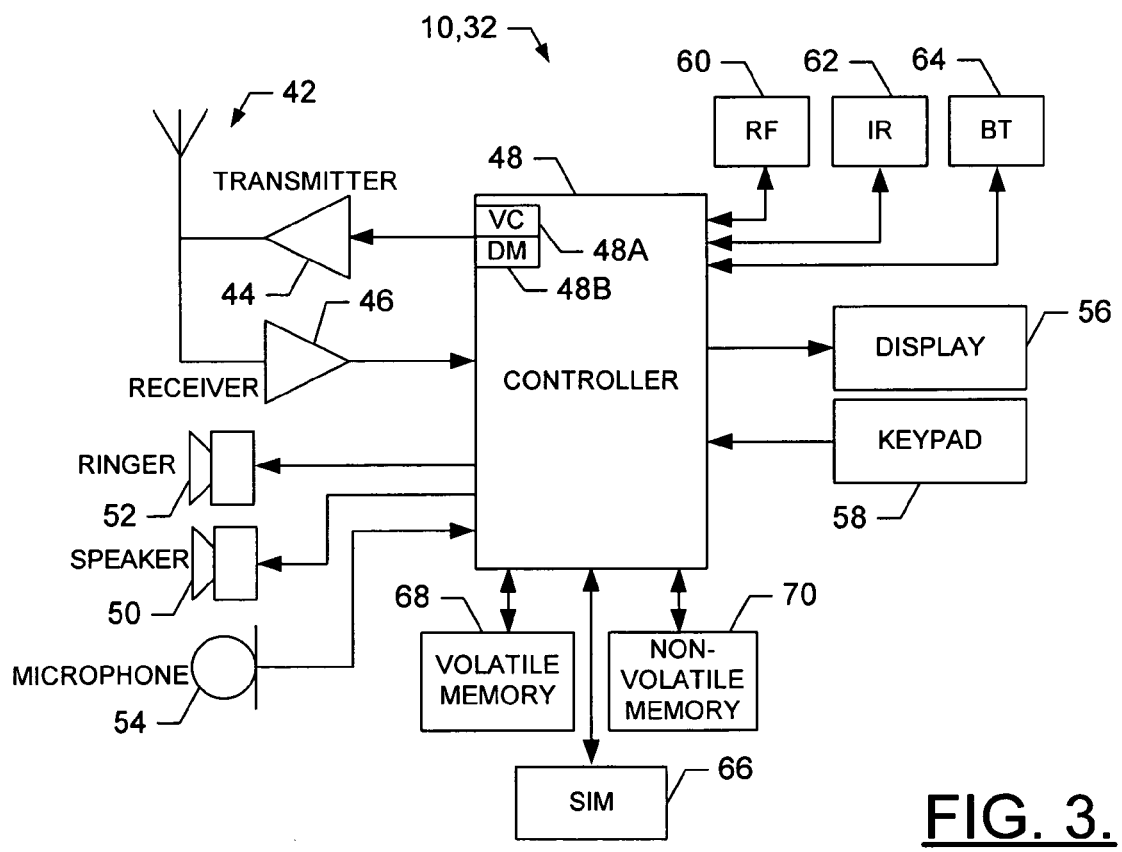
Figure 4:
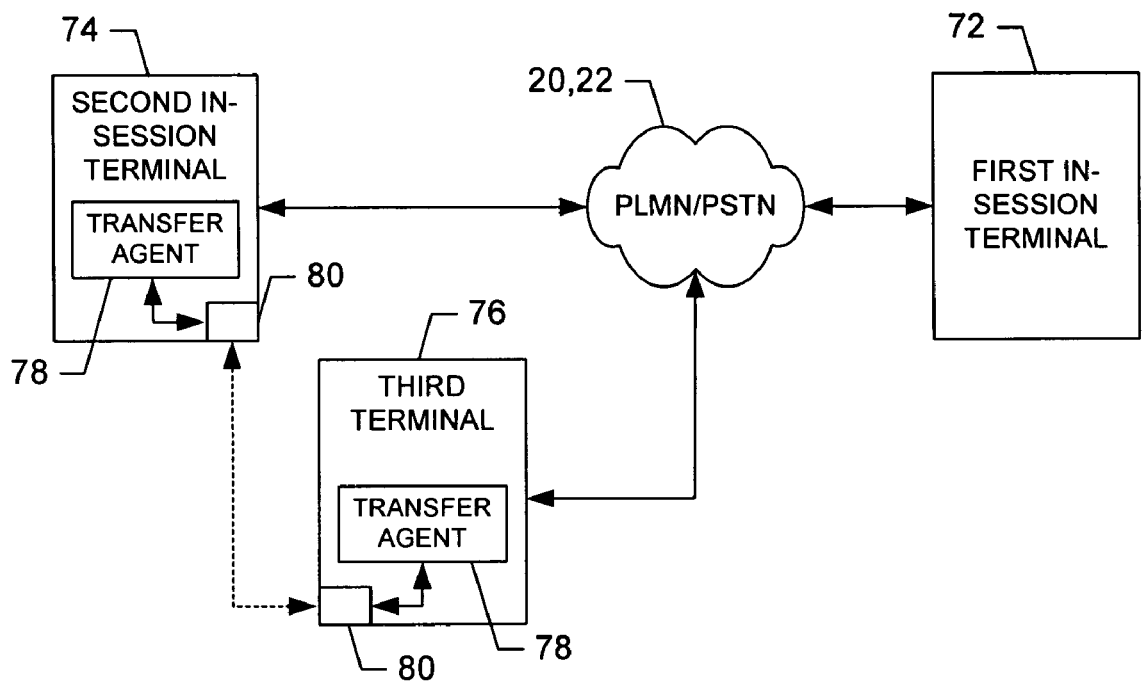
Figure 5:
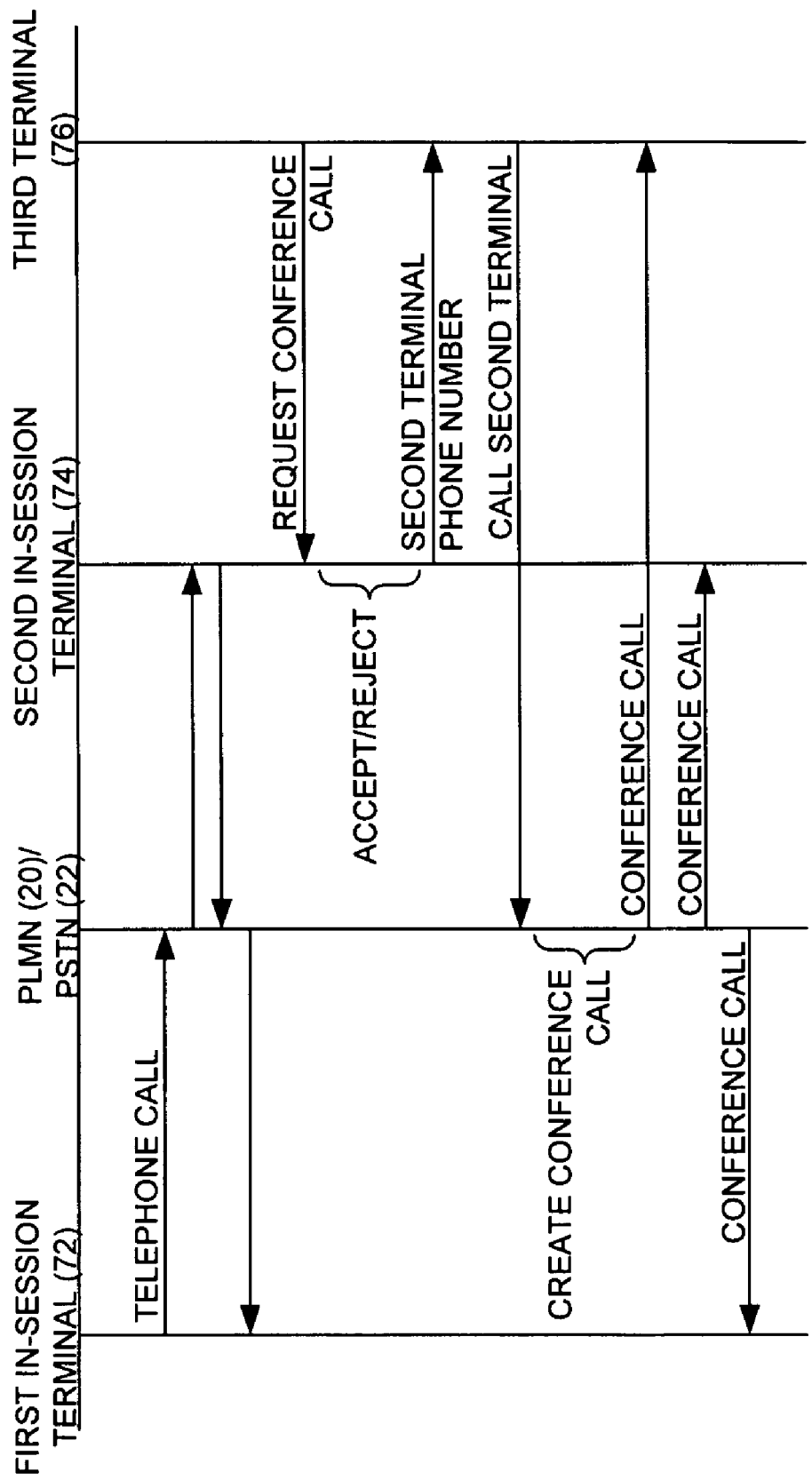
Figure 6:
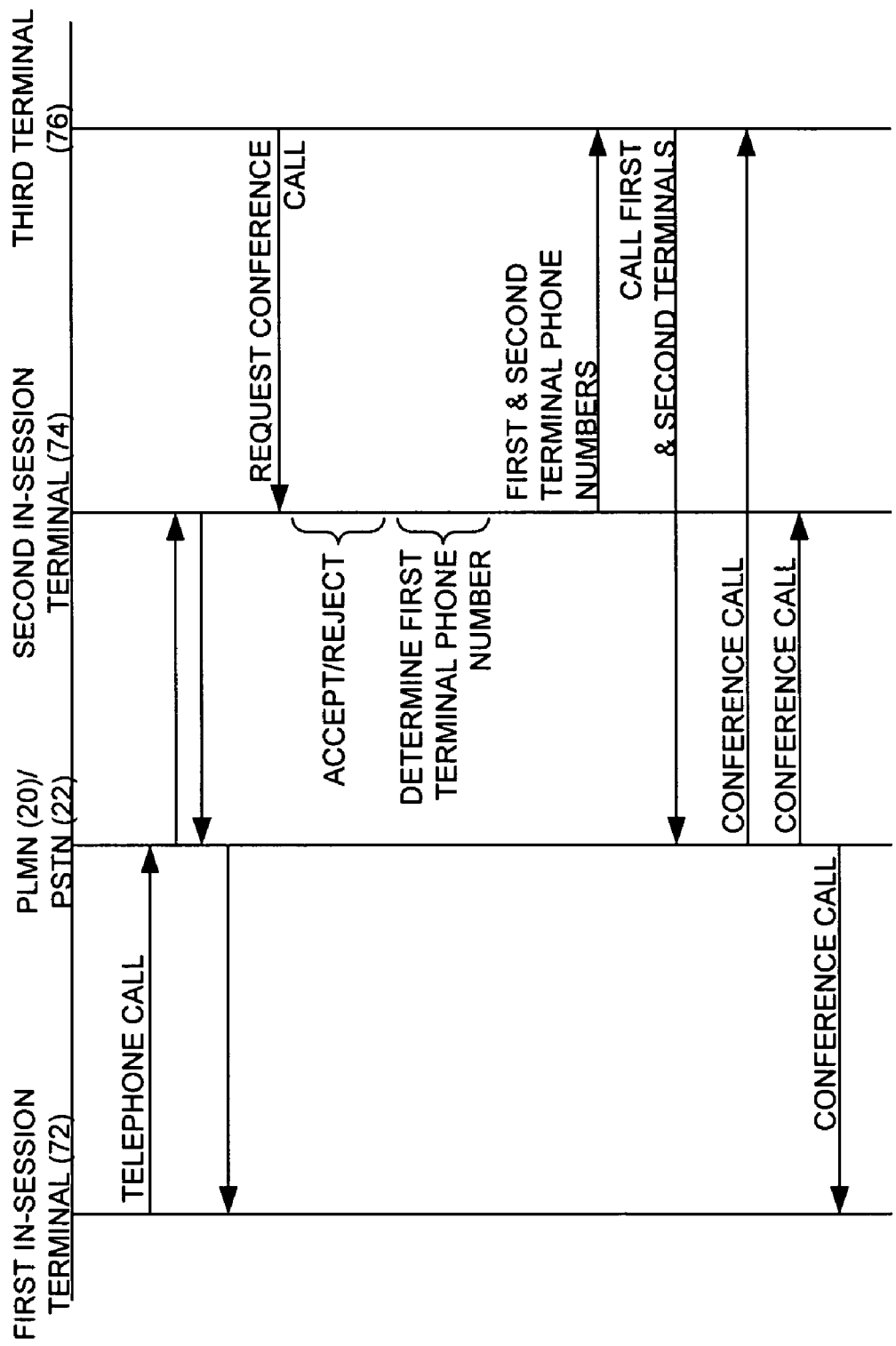
Figure 7:
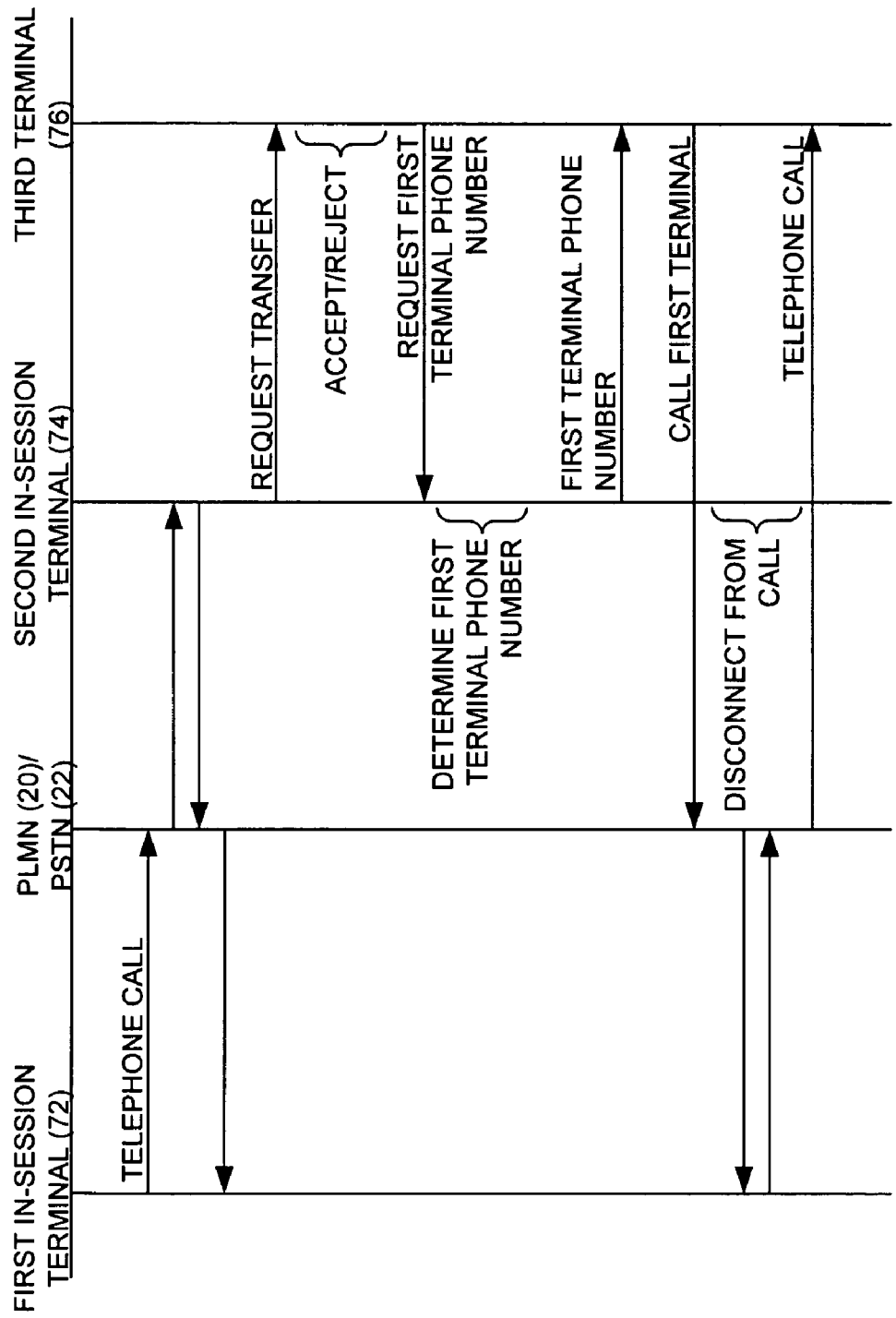
Figure 8:
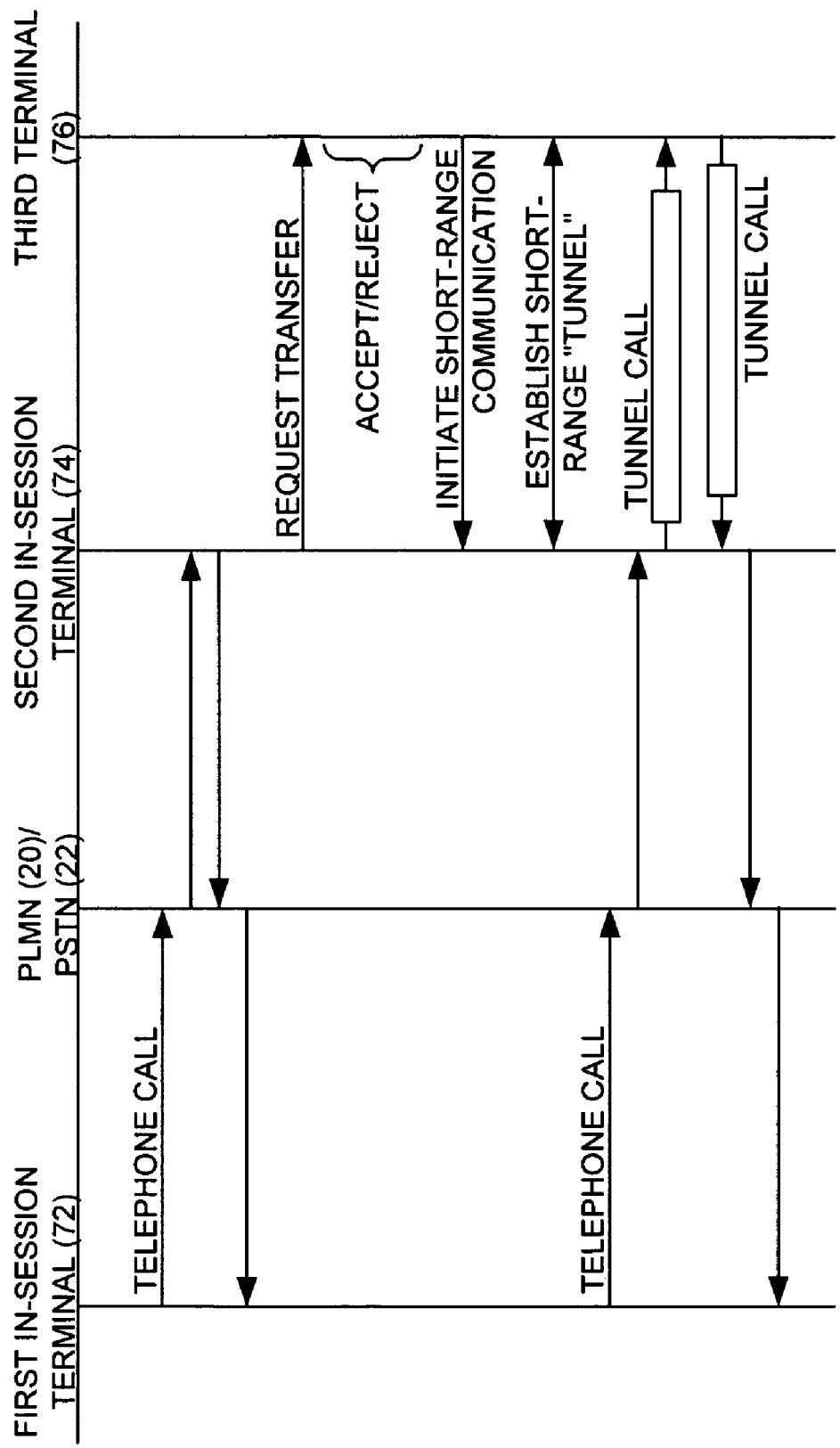

Having thus described the invention in general terms, reference will now be made to the accompanying drawings, which are not necessarily drawn to scale, and wherein:

FIG. 1 is a schematic block diagram of a communications system according to one embodiment of the present invention including a cellular network, a public-switched telephone network and a data network;

FIG. 2 is a schematic block diagram of an entity capable of operating as a terminal, or more particularly, a mobile terminal and/or a fixed terminal, in accordance with embodiments of the present invention;

FIG. 3 is a schematic block diagram of a mobile station that may operate as a terminal, according to embodiments of the present invention;

FIG. 4 is a functional block diagram of a third terminal joining a communication session between first and second terminals, according to embodiments of the present invention;

FIGS. 5 and 6 are control flow diagrams of a third terminal joining a communication session between first and second terminals, according to embodiments of the present invention;

FIG. 7 is a control flow diagram of a communication session between first and second terminals being transferred from the second terminal to a third terminal, according to embodiments of the present invention; and FIG. 8 is a control flow diagram of communication during a communication session between first and second terminals being transferred from the second terminal to a third terminal, according to embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of communications system that would benefit from the present invention is provided. It should be understood, however, that the terminals illustrated and hereinafter described is merely illustrative of two types of terminals that would benefit from the present invention and, therefore, should not be taken to limit the scope of the present invention. The system and method of the present invention will be primarily described in conjunction with mobile communications applications. It should be understood, however, that the system and method of the present invention can be utilized in conjunction with a variety of other applications, both in the mobile communications industries and outside of the mobile communications industries.

As shown, a circuit-switched mobile terminal 10 is capable of transmitting signals to and receiving signals from a base site or base station (BS) 12. The base station is a part of a cellular network that includes a mobile switching center (MSC) 14, voice coder/decoders (vocoders) (VC) 16, data modems (DM) 18, and other units required to operate the cellular network. The MSC is capable of routing calls and messages to and from the mobile terminal when the mobile terminal is making and receiving calls. The MSC also controls the forwarding of messages to and from the mobile terminal when the terminal is registered with the cellular network, and controls the forwarding of messages for the mobile terminal to and from a message center (not shown). As will be appreciated by those skilled in the art, the cellular network may also be referred to as a Public Land Mobile Network (PLMN) 20.

The PLMN 20 is capable of providing audio communications in accordance with a number of different techniques. In this regard, the PLMN is capable of operating in accordance with any of a number of first-generation (1G), second-generation (2G), 2.5G and/or third-generation (3G) communication techniques, and/or any of a number of other cellular communication techniques capable of operating in accordance with embodiments of the present invention. For example, the PLMN can be capable of operating in accordance with GSM (Global System for Mobile Communication), IS-136 (Time Domain Multiple Access—TDMA), IS-95 (Code Division Multiple Access—CDMA), or EDGE (Enhanced Data GSM Environment) communication techniques. Within the PLMN, signaling communications may be provided in accordance with any of a number of different techniques, but signaling communications are typically provided in accordance with the Signaling System 7 (SS7) standard.

The MSC 14, and thus the PLMN 20, can be coupled to a Public Switched Telephone Network (PSTN) 22 that, in turn, is coupled to one, or more typically, a plurality of circuit-switched fixed terminals 24, such as wireline and/or wireless telephones. Like the PLMN, the PSTN is capable of providing signaling communications in accordance with any of a number of different techniques, including SS7. The PSTN is also capable of providing audio communications in accordance with any of a number of different techniques. For example, the PSTN may operate in accordance with Time Division Multiplexing (TDM) techniques, such as 64 Kbps (CCIT), and/or Pulse Code Modulation (PCM) techniques, such as 56 Kbps (ANSI).

The PLMN 20 (via the MSC 14) and the PSTN 22 can be coupled to, electrically connected to, or otherwise in electrical communication with a packet-switched network, such as an Internet Protocol (IP) network 26. The IP network may be coupled to one or more packet-switched fixed terminals 28. Additionally, the IP network may be coupled to one or more wireless access points (APs) 30, which may be coupled to one or more packet-switched mobile terminals 32. As shown, the IP network comprises a Wireless Local Area Network (WLAN), thereby providing communications in accordance with IEEE 802.11, for example. The packet-switched network can equally comprise any of a number of other types of networks. For example, the packet-switched network can comprise Universal Mobile Telecommunications Service (UMTS) or cdma2000 networks without departing from the spirit and scope of the present invention. As such, the packet-switched network can equally be configured to provide voice communications in accordance with voice over IP (VoIP), for example, without departing from the spirit and scope of the present invention.

The IP network 26 may be capable of providing signaling communications in accordance with any of a number of different techniques. For example, the IP network may be capable of providing signaling in accordance with the Session Initiation Protocol (SIP). In this regard, SIP typically provides signaling for initiating a session between two or more endpoints in the IP network by making those endpoints aware of the session semantics. Accordingly, devices (or users that run certain applications on these devices) are registered with the SIP backbone so that an invitation to a particular session can be correctly delivered to these endpoints. To achieve this, SIP provides a registration mechanism for devices and users, and it applies mechanisms such as an SIP server 40 to route the session invitations appropriately.

To facilitate voice communications between the IP network 26, and the PLMN 20 and PSTN 22, the communications system typically also includes one or more gateways (GWs) 34. The gateway(s) can be capable of mapping signaling and voice communications between the IP network, and the PLMN and/or PSTN to thereby permit communications between the IP network, and the PLMN and/or PSTN. In accordance with SIP, for example, the gateway may include a media gateway (not shown) that converts transmissions between a packet stream from the IP network and the voice-encoded communication (e.g., TDM or PCM) from the PLMN and/or PSTN. Thus, voice can be carried in packets over a packet-switched connection between a packet-switched mobile terminal 32 (via an AP 30) or packet-switched fixed terminal 28 and the media gateway, while voice is carried over voice-encoded communication circuits in a circuit-switched connection between the media gateway and the circuit-switched fixed terminal 24.

Also in accordance with SIP, the gateway(s) 34 may include a media gateway control function (not shown) that operates to terminate SIP signaling and control the functions of the media gateway. In this regard, the media gateway control function controls the functions of media gateway in accordance with the Media Gateway Control (MEGACO) protocol, such as that described in the IETF request for comment document RFC 3015, entitled: *Megaco Protocol Version 1.0*, the contents of which are hereby incorporated by reference in its entirety. In addition to terminating SIP signaling and controlling the media gateway, the media gateway control function also typically performs conversion between SIP signaling in the IP network 26 and SS7 signaling in the PLMN 20 and/or PSTN 22, such as for call control.

Referring now to FIG. 2, a block diagram of an entity capable of operating as a terminal, or more particularly, a mobile terminal 10, 32 and/or a fixed terminal 24, 28, is shown in accordance with one embodiment of the present invention. As shown, the entity capable of operating as a terminal can generally include a processor 36 connected to a memory 38. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

The processor 36 can also be connected to at least one interface 40 or other means for transmitting and/or receiving data, content or the like. The interface(s) can include a means for communicating in accordance with any one or more of a number of different communication techniques. For example, when the entity comprises a circuit-switched mobile terminal 10, the interface(s) can include means for communicating in accordance with any of a number of 1G, 2G, 2.5G and/or 3G communication techniques. When the entity comprises a circuit-switched fixed terminal 24, the interface(s) can include a means for communicating in accordance with TDM and/or PCM techniques. And when the entity comprises a packet-switched fixed terminal 28 or a packet-switched mobile terminal 32, the interface(s) can include a means for communicating in accordance with VoIP techniques.

The interface(s) can also include one or more means for sharing and/or obtaining data in accordance with one or more near-field communication techniques. For example, the interface(s) can include a short-range radio frequency (RF) module comprising an RF transmitter, receiver, transceiver, or transponder tag so that data can be shared with and/or obtained from other entities, such as mobile terminals, fixed terminals or the like, that include other RF transmitters, receivers, transceivers or transponder tags. For more information on sharing data in accordance with one radio frequency technique, see ECMA International (European Association for Standardizing Information and Communication Systems) Standard ECMA-340 entitled: *Near Field Communication—Interface and Protocol (NFCIP-1)* (2002), the contents of which are hereby incorporated by reference in its entirety.

In one embodiment, the entity can include an RF transceiver capable of operating as a transponder tag during operation of the method of embodiments of the present invention. For more information on such transceivers, see PCT Patent Application PCT/IB03/02900, entitled: Reader Device for Radio Frequency Identification Transponder with Transponder Functionality, filed on Jul. 22, 2003, the contents of which are hereby incorporated by reference in its entirety. As described herein, then, the term "transponder tag" can refer to a transponder tag or a transceiver capable of functionally operating as a transponder tag during operation of embodiments of the present invention. Similarly, the term "transceiver" can refer to a transceiver capable of functionally operating as a transponder tag during operation of embodiments of the present invention.

The interface(s) can additionally or alternatively include other short-range modules, such as, for example an infrared (IR) module (IR transmitter, receiver or transceiver), and/or a Bluetooth module (Bluetooth transmitter, receiver or transceiver) operating using Bluetooth brand wireless technology developed by the Bluetooth Special Interest Group. The entity can therefore additionally or alternatively be capable of transmitting data to and/or receiving data from other entities and/or tags in accordance with such techniques. Although not shown, the interface(s) can additionally or alternatively be capable of transmitting and/or receiving data from entities and/or tags according to a number of different wireless networking techniques, including WLAN techniques such as IEEE 802.11 techniques or the like.

More particularly, the circuit-switched fixed terminal 24 and the packet-switched fixed terminal 30 can comprise any of a number of known devices capable of providing audio and/or video communications in accordance with circuit-switched and packet-switched techniques, respectively. For example, the circuit-switched fixed terminal can comprise any of a number of known, conventional fixed wireline or wireless telephones capable of engaging in voice calls and/or video calls. The packet-switched fixed terminal, for example, can comprise any of a number of known, conventional IP-enabled wireline or wireless telephones also capable of engaging in voice calls and/or video calls. Also, for example, the packet-switched fixed terminal can comprise a processor, such as a personal computer, laptop computer or the like, capable of operating a software application for providing audio and/or video communications in accordance with packet-switched techniques. As will be appreciated by those skilled in the art, and in accordance with embodiments of the present invention, the packet-switched fixed terminal may be capable of operating in accordance with the circuit-switched fixed terminal, and vice versa. As such, as described herein, the term "fixed terminal" will be used to describe a single fixed terminal capable of performing the functions of a packet-switched fixed terminal and/or a circuit-switched fixed terminal.

Like with the circuit-switched fixed terminal 24 and packet-switched fixed terminal 28, in accordance with embodiments of the present invention, the packet-switched mobile terminal may be capable of operating in accordance with the circuit-switched mobile terminal, and vice versa. Thus, as described herein, the term "mobile terminal" will be used to describe a single mobile terminal capable of performing the functions of a packet-switched mobile terminal and/or a circuit-switched mobile terminal. Also, while the mobile terminal may be shown and described herein as comprising a mobile telephone, a mobile telephone is merely illustrative of one type of terminal that would benefit from the present invention and, therefore, should not be taken to limit the scope of the present invention. In this regard, while several embodiments of the mobile terminal are illustrated and will be hereinafter described for purposes of example, other types of mobile terminals, such as portable digital assistants (PDAs), pagers, laptop computers and other types of audio, video and/or and text communications systems, can readily employ the present invention.

Reference is now drawn to FIG. 3, which illustrates a block diagram of a mobile terminal 10, 32, in accordance with one embodiment of the present invention. As shown, in addition to an antenna 42, the mobile terminal 10, 32 can include a transmitter 44, receiver 46, and controller 48 or other processor that provides signals to and receives signals from the transmitter and receiver, respectively. These signals include signaling information in accordance with the air interface standard of the applicable cellular system, and also user speech and/or user generated data. In this regard, the mobile terminal can be capable of operating with one or more air interface standards, communication protocols, modulation types, and access types. More particularly, the mobile terminal can be capable of operating in accordance with any of a number of 1G, 2G, 2.5G and/or 3G communication protocols or the like. For example, the mobile terminal may be capable of operating in accordance with 2G wireless communication protocols IS-136 (TDMA), GSM, and IS-95 (CDMA). Also, for example, the mobile terminal may be capable of operating in accordance with 2.5G wireless communication protocols GPRS, Enhanced Data GSM Environment (EDGE), or the like. Further, for example, the mobile terminal may be capable of operating in accordance with 3G wireless communication protocols such as Universal Mobile Telephone System (UMTS) employing Wideband Code Division Multiple Access (WCDMA) radio access technology. The mobile terminal can also be capable of operating in accordance with enhanced 3G wireless communication protocols such as 1XEV-DO (TIA/EIA/IS-856) and 1XEV-DV. Some narrowband AMPS (NAMPS), as well as TACS, mobile terminals may also benefit from the teaching of this invention, as should dual or higher mode phones (e.g., digital/analog or TDMA/CDMA/analog phones).

It is understood that the controller 48 includes the circuitry required for implementing the audio and logic functions of the mobile terminal. For example, the controller may be comprised of a digital signal processor device, a microprocessor device, and various analog-to-digital converters, digital-to-analog converters, and/or other support circuits. The control and signal processing functions of the mobile terminal are allocated between these devices according to their respective capabilities. The controller can additionally include an internal voice coder (VC) 48A, and may include an internal data modem (DM) 48B. Further, the controller may include the functionality to operate one or more software programs, which may be stored in memory (described below). For example, the controller may be capable of operating a connectivity program, such as a conventional Web browser. The connectivity program may then allow the mobile terminal to transmit and receive Web content, such as according to the Hypertext Transfer Protocol (HTTP) and/or the Wireless Application Protocol (WAP), for example.

The mobile terminal also comprises a user interface including a conventional earphone or speaker 50, a ringer 52, a microphone 54, a display 56, and a user input interface, all of which are coupled to the controller 48. The user input interface, which allows the mobile terminal to receive data, can comprise any of a number of devices allowing the mobile terminal to receive data, such as a keypad 58, a touch display (not shown) or other input device. In embodiments including a keypad, the keypad includes the conventional numeric (0-9) and related keys (#, *), and other keys used for operating the mobile terminal. Although not shown, the mobile terminal can include a battery, such as a vibrating battery pack, for powering the various circuits that are required to operate the mobile terminal, as well as optionally providing mechanical vibration as a detectable output.

As indicated above, the mobile terminal 10, 32 can also include one or more means for sharing and/or obtaining data from electronic devices such as other mobile terminals, fixed terminals 24, 28 or the like (see FIG. 1), in accordance with one or more near-field communication techniques. As shown in FIG. 3, the mobile terminal can include a short-range RF module 60 comprising an RF transmitter, receiver, transceiver or transponder tag so that data can be shared with and/or obtained from other mobile terminals, fixed terminals or the like that include other RF transmitters, receivers, transceivers, transponder tags, or transceivers capable of operating as a transponder tag. In addition or in the alternative, the mobile terminal can include other short-range modules, such as, for example an IR module 62 (IR transmitter, receiver or transceiver), and/or a Bluetooth module 64 (Bluetooth transmitter, receiver or transceiver), as well as means for transmitting and/or receiving data according to a number of different wireless networking techniques, including WLAN techniques such as IEEE 802.11 techniques or the like.

The mobile terminal 10, 32 can further include memory, such as a subscriber identity module (SIM) 66, a removable user identity module (R-UIM) or the like, which typically stores information elements related to a mobile subscriber. In addition to the SIM, the mobile terminal can include other removable and/or fixed memory. In this regard, the mobile terminal can include volatile memory 68, such as volatile random access memory (RAM) including a cache area for the temporary storage of data. The mobile terminal can also include other non-volatile memory 70, which can be embedded and/or may be removable. The non-volatile memory can additionally or alternatively comprise an EEPROM, flash memory or the like. The memories can store any of a number of pieces of information, and data, used by the mobile terminal to implement the functions of the mobile terminal. For example, the memories can store an identifier, such as an international mobile equipment identification (IMEI) code, international mobile subscriber identification (IMSI) code, mobile station integrated services digital network (MSISDN) code (mobile telephone number), Internet Protocol (IP) address, Session Initiation Protocol (SIP) address or the like, capable of uniquely identifying the mobile terminal, such as to the PLMN 20 and/or PSTN 22.

The memories can also store one or more applications capable of operating on the mobile terminal 10, 32. As explained below, the memories can further store a transfer agent capable of controlling the transfer or joining (e.g., conferencing) of a communication session (e.g., voice call, video call, etc.) between a terminal (mobile terminal or fixed terminal 24, 28) and a transferor terminal (mobile terminal or fixed terminal). In such an instance, the transfer agent can be responsive to short-range communications between the terminal transferring into or joining the communication session and one of the terminals in the communication session (i.e., in-session terminals), as also explained below.

As explained in the background section, while current techniques for permitting a terminal user to break into a communication session between two other terminal users are adequate, such techniques have drawbacks. Embodiments of the present invention therefore provide an improved system and associated terminal and method for short-range initiation of joining and/or transferring a communication session. Reference is now drawn to FIG. 4, which illustrates a functional block diagram of three terminals 10 (mobile terminals 10, 32 and/or fixed terminals 24, 28) performing a method of joining or transferring a communication session between the first two terminals to a third terminal, in accordance with one embodiment of the present invention. More particularly, FIG. 4 illustrates a functional block diagram of a first terminal 72 (e.g., mobile terminal 10, 32 or fixed terminal 24, 28) engaged in a communication session with a second terminal 74 via one or more networks, including the PLMN 20 and/or the PSTN 22. While the first and second terminals are engaged in the communication session, a third terminal 76, located proximate the second terminal, desires to join the communication session or have the communication session transferred from the second terminal to the third terminal.

As indicated above, the second terminal and/or the third terminal (as well as the first terminal, if so desired), can operate a transfer agent 78 capable of controlling the transfer or joining of the communication session between the first terminal 72 and the second terminal 74. As indicated above and described herein, the transfer agents typically comprise software capable of being stored within memory (e.g., non-volatile memory 70), and operated by a processor (e.g., controller 48). It should be understood, however, that the transfer agents can alternatively comprise firmware or hardware, without departing from the spirit and scope of the present invention. The transfer agents can be responsive to communication across a short-range communication link between the second terminal and the third terminal to initiate the transfer or joining of the communication session. In this regard, the second and third terminals (as well as the first terminal, if so desired) can each include one or more short-range communication modules 80, such as one or more RF modules (e.g., RF module 60), IR modules (e.g., IR module 62) and Bluetooth modules (e.g., Bluetooth module 64), capable of establishing a short-range communication link and transmitting and/or receiving data, information, communications or the like across the short-range communication link.

Reference will now be made to FIGS. 5, 6 and 7, which illustrate control flow diagrams of a method of joining or transferring a communication session between first and second terminals 72, 74, the communication session being joined by or transferred to a third terminal 76. As shown and described below, the communication session comprises a voice or video call between the first and second terminals. The second or third terminal, then, desires to join the call, or transfer the second terminal's end of the call to the third terminal. As also described below, the short-range communication module(s) 80 of the second and third terminals comprise RF modules (e.g., RF modules 60). It should be understood, however, that the short-range communication modules can comprise any of a number of other modules without departing from the spirit and scope of the present invention. It should also be understood that although a conference call can be formed by the third terminal joining a call between the first and second terminals, the call itself can comprise a voice or video conference call between the first and second terminals and one or more other terminals (not shown) before the third terminal joins the call or is transferred into the call.

Referring more particularly the FIG. 5, a method of joining a third terminal 76 into a voice or video call between a first terminal 72, and a second terminal 74 in proximity to the third terminal, includes the first and second terminals being engaged in a call across one or more networks (e.g., PLMN 20 and/or PSTN 22). As the first and second terminals are engaged in the call, the third terminal can select the second terminal to thereby request to join a conference call with the first and second terminals. Alternatively, although not shown, the second terminal can select the third terminal to thereby request that the third terminal join a conference all between the first and second terminals.

The second terminal 74 or the third terminal 76 can be selected in any of a number of different manners. In one embodiment, for example, the short-range communication module(s) 80 of the second terminal include an RF transponder tag that stores an identifier of the second terminal (e.g., IMEI code, IMSI code, telephone number, etc.). The short-range communication module(s) of the third terminal, on the other hand, include an RF transceiver or reader. In such an instance, the third terminal can select the second terminal by establishing an RF communication link between the RF transponder tag of the second terminal and the RF transceiver of the third terminal to thereby receive the identifier of the second terminal. In this regard, the RF transceiver of the third terminal can establish an RF communication link with the RF transponder tag of the second terminal in any of a number of different manners.

For example, third terminal user can establish an RF communication link by passing the third terminal 76, or more particularly the RF transceiver (i.e., short-range communication module 80) of the third terminal, within a predefined distance of the transponder tag (i.e., short-range communication module) of the second terminal 74. Thereafter, if so desired, the third terminal, or more particularly the transfer agent 78 of the third terminal, can receive an instruction from a third terminal user, such as via a user interface of the third terminal, to initiate communication with the RF transponder tag of the second terminal. According to embodiments of the present invention, the predefined distance between the RF transponder tag and the RF transceiver is typically short such as, for example, from substantially zero to a few centimeters. In such instances, selecting the RF transponder tag may require the third terminal user touching the RF transceiver to the RF transponder tag.

After establishing the RF communication link between the RF transponder tag (i.e., short-range communication module 80) of the second terminal 74 and the RF transceiver of the third terminal 76, the transfer agent 78 of the third terminal can direct the RF transceiver (i.e., short-range communication module) to send a request or an interrogation signal to the RF transponder tag for an identifier (e.g., telephone number) of the second terminal coded in the RF transponder tag. By sending the request to the RF transponder tag, the third terminal can receive the second terminal identifier, which the third terminal can thereafter utilize to request a conference call with the first terminal 72 and the second terminal 74, as explained below. Upon receiving the request, then, the RF transponder tag can then transmit the second terminal identifier back to the RF transceiver of the third terminal, or more particularly the transfer agent 80 of the third terminal. Before the RF transponder tag transmits the second terminal identifier back to the RF transceiver, however, the second terminal, or more particularly the transfer agent of the second terminal, can solicit an instruction from the second terminal user whether to accept or reject the request for the identifier of the second terminal, such as via a user interface of the second terminal. In such instances, if the second terminal user accepts the request from the third terminal, the transfer agent of the second terminal can direct the RF transponder tag to transmit the second terminal identifier to the RF transceiver.

Although the second terminal 74 or the third terminal 76 can be selected in the aforementioned exemplar manner, it should be understood that the second or third terminals can be selected in any of a number of other manners without departing from the spirit and scope of the present invention. In another embodiment, for example, the short-range communication module(s) 80 of each of the second and third terminals also include a Bluetooth module (e.g., Bluetooth module 64). In such an instance, the RF transponder tag of the second terminal can store a Bluetooth identifier and/or other Bluetooth parameters required to establish a Bluetooth communication link with the Bluetooth module of the second terminal. The Bluetooth module of second terminal can be provided with the second terminal identifier, such as by the transfer agent 78 of the second terminal, to thereby transmit the second terminal identifier to the third terminal.

Similar to before, then, the third terminal 76 can select the second terminal 74 and thereafter receive the Bluetooth identifier or other Bluetooth parameters required to establish a Bluetooth communication link with the Bluetooth module of the second terminal. Using the Bluetooth identifier/parameters, the third terminal, or more particularly the transfer agent 78 of the third terminal, can establish a Bluetooth communication link with the transfer agent of the second terminal via the Bluetooth modules of the second and third terminals. Also similar to before, before establishing the Bluetooth communication link with the second terminal, the second terminal, or more particularly the transfer agent of the second terminal, can solicit an instruction from the second terminal user whether to accept or reject the request to establish the Bluetooth communication link with the third terminal. After establishing the Bluetooth communication link, the transfer agent of the second terminal can transmit the second terminal identifier to the transfer module of the third terminal, again receiving an instruction whether to transmit the second terminal identifier, if so desired.

The aforementioned examples have been shown and described with respect to the third terminal 76 selecting the second terminal 74, and thereafter receiving the second terminal identifier (e.g., telephone number). It should be understood, however, that the second terminal can be configured to similarly select the third terminal, and receive an identifier (e.g., telephone number) of the third terminal. In such instances, the short-range communication module(s) 80 of the second terminal can include an RF transceiver or reader, while the short-range communication module(s) of the third terminal include an RF transponder tag that stores the third terminal identifier or a Bluetooth identifier. At this point it should be understood that although the following description may presume the third terminal selected and received the identifier of the second terminal, the same description can equally apply to the second terminal selecting and receiving the identifier of the third terminal, without departing from the spirit and scope of the present invention.

Irrespective of how the second terminal 74 transmits the second terminal identifier to the third terminal, the third terminal 76, or more particularly the transfer agent 78 of the third terminal, can respond to receipt of the second terminal identifier in any of a number of different manners to facilitate joining the call between the first terminal 72 and the second terminal 74. The transfer agent of the third terminal can be pre-configured with an action to perform with respect to the received second terminal identifier, for example. Alternatively, for example, the transfer agent of the third terminal can be configured to solicit an instruction from the third terminal user as to an action to perform with respect to the received second terminal identifier, such as via a user interface of the third terminal.

In another alternative, the second terminal 74 can instruct the third terminal 76, or more particularly the transfer agent 78 of the third terminal, as to an action to perform. For example, the second terminal can instruct the transfer agent of the third terminal by sending an appropriate instruction to the third terminal along with the second terminal identifier. When the short-range communication module(s) 80 of the second terminal include an RF transponder tag, for example, the RF transponder tag can be coded with an action for the transfer agent of the third terminal to perform with respect to the second terminal identifier. In this regard, if so desired, the RF transponder tag can be dynamically-configurable such that the action can be modifiable. In such an instance, before the second terminal transmits the second terminal identifier to the third terminal, the transfer agent of the second terminal can receive a selection of an action from the second terminal user, such as whether to join the third terminal into a conference call or transfer the call from the second terminal to the third terminal.

Irrespective of how the transfer agent 78 of the third terminal 76 receives the action to perform with respect to the second terminal identifier, presume the action includes joining the call between the first terminal 72 and the second terminal 74, as shown in FIG. 5. In such an instance, the third terminal can request, or more particularly the transfer agent of the third terminal can direct the third terminal to request, a communication session with the second terminal based upon the second terminal identifier previously received by the transfer agent. In this regard, the third terminal can request a call with the second terminal by communicating the second terminal identifier to the same network(s) (e.g., PLMN 20 and/or PSTN 22) across which the first and second terminals are engaged in a call. More particularly, for example, the third terminal can place a call to the second terminal via the network(s).

Then, in response to receiving the request from the third terminal 76, and recognizing that the second terminal 74 is engaged in a voice call with the first terminal 72, the network(s), or more particularly one or more appropriate network elements (e.g., MSC 14) of the network(s), can be configured to create a conference call between the first, second and third terminals. Alternatively, when the first and second terminals are engaged in a video call, the network(s) can be configured to create a videoconference call between the first, second and third terminals. In this regard, the network(s) can be configured to create a conference call, for example, by joining the third terminal into the call between the first and second terminals. Thereafter, the first, second and third terminals can simultaneously communicate with one another via the same communication session or conference call across the network(s).

As explained above, the third terminal 76 receives the second terminal identifier, and requests a communication session with the second terminal. The network(s) across which the first terminal 72 and the second terminal 74 are communicating, then, receive the request from the third terminal, and create a conference call based on the current call between the first and second terminals. In an alternative embodiment, shown in FIG. 6, in addition to receiving the second terminal identifier, the third terminal can also receive an identifier (e.g., telephone number) of the first terminal. For example, after the third terminal selects the second terminal, the second terminal can determine the first terminal identifier. In this regard, when the second terminal initiated the call with the first terminal, the second terminal can determine the first terminal identifier based upon the identifier communicated to the network(s) (e.g., PLMN 20 and/or PSTN 22) to initiate the call. On the other hand, when the first terminal initiated the call with the second terminal, the second terminal can determine the first terminal identifier based upon the first terminal identifier sent to the second terminal when the network(s) established the call between the first and second terminals.

Irrespective of how the second terminal 74 determines the first terminal identifier, before, after or as the second terminal sends the second terminal identifier to the third terminal 76, or more particularly the transfer agent 78 of the third terminal, the second terminal can also send the first terminal identifier to the third terminal. The first terminal identifier can be sent or otherwise transmitted to the third terminal in any of a number of different manners, such as via the same or a different short-range communication module(s) 80 than the module that sends the second terminal identifier. Then, after receiving the first and second terminal identifiers, the third terminal can request, or more particularly the transfer agent of the third terminal can direct the third terminal to request, a communication session with the first and second terminals based upon the first and second terminal identifiers previously received by the transfer agent of the third terminal. In this regard, the third terminal can request a simultaneous call with the first and second terminals by communicating the first and second terminal identifiers to the same network(s) (e.g., PLMN 20 and/or PSTN 22) across which the first and second terminals are engaged in a call. More particularly, for example, the third terminal can place a call to the first and second terminals via the network(s), the network(s) being capable of establishing a conference call between the first, second and third terminals.

Then, in response to receiving the request from the third terminal 76, the network(s), or more particularly one or more appropriate network elements (e.g., MSC 14) of the network(s), can be configured to establish a simultaneous call, or conference call, between the first terminal 72, second terminal 74 and third terminal. In this regard, the network(s) can be configured to create a conference call, for example, by establishing a conference call between the first, second and third terminals, such as in a manner irrespective of the existing call between the first and second terminals. Thereafter, the first, second and third terminals can simultaneously communicate with one another via the same communication session or conference call across the network(s).

As explained above with respect to FIGS. 5 and 6, the transfer agent 78 of the third terminal 76 receives an action to perform with respect to the second terminal identifier, the action including joining the third terminal in a conference call with the first terminal 72 and the second terminal 74. Alternatively, however, the action can include transferring the existing call between the first and second terminals from the second terminal to the third terminal. In such instances, the methods can proceed in a manner similar to before, with the second terminal disconnecting from the call now between the first, second and third terminals. In this regard, the second terminal can disconnect from the call at any point after the call is capable of being transferred to the third terminal.

Reference is now made to FIG. 7, which illustrates a control flow diagram of the second terminal 74 transferring a voice or video call to the third terminal 76 in accordance with one embodiment of the present invention, the call originally being between the first terminal 72 and the second terminal. Although the method can include the third terminal selecting the second terminal to establish a short-range communication link with the second terminal, as explained above, as shown, the second terminal can alternatively select the third terminal to establish a short-range communication link with the second terminal to request that the call between the first and second terminals be transferred from the second terminal to the third terminal. Upon receiving the request, the third terminal, or more particularly the transfer agent 78 of the third terminal, can request the first terminal identifier across the short-range communication link via the short-range communication module(s) 80 of the second and third terminals, such as in a manner explained above. Before requesting the first terminal identifier, however, the transfer agent of the third terminal can solicit an instruction from the third terminal user whether to accept or reject the request to transfer the call. In such instances, if the third terminal user accepts the request from the second terminal, the transfer agent of the third terminal can request the first terminal identifier.

In response to receiving the request for the first terminal identifier, the second terminal 74 can determine the first terminal identifier, such as in a manner explained above. Thereafter, the second terminal can send the first terminal identifier to the third terminal 76, or more particularly the transfer agent 78 of the third terminal, such as in a manner explained above. Thereafter, the third terminal can request, or more particularly the transfer agent of the third terminal can direct the third terminal to request, a communication session with the first terminal based upon the first terminal identifier previously received by the transfer agent. In this regard, the third terminal can request a call with the first terminal by communicating the first terminal identifier to the same network(s) (e.g., PLMN 20 and/or PSTN 22) across which the first and second terminals are engaged in a call. More particularly, for example, the third terminal can place a call to the first terminal via the network(s).

Then, in response to receiving the request from the third terminal 76, the network(s), or more particularly one or more appropriate network elements (e.g., MSC 14) of the network (s), can establish a communication session or call between the first terminal 72 and the third terminal. As the call is established between the first terminal and the third terminal, the second terminal 74 can disconnect from or otherwise terminate, or more particularly the transfer agent 78 of the second terminal can direct the second terminal to disconnect from or otherwise terminate, from the call between the first terminal and the second terminal. Thus, with the second terminal disconnecting from the call between the first and second terminals as the call is established between the first and third terminals, the call from the first terminal can be transferred from the second terminal to the third terminal. Thereafter, the first and third terminals can communicate with one another via the same communication session or conference call across the network(s).

As will be appreciated, in various instances it may be desirable to permit the third terminal 76 to communicate with the first terminal 72 via the second terminal 74 and the call between the second terminal and the first terminal. In such instances, the second terminal can interconnect the first and third terminals during the communication session without transferring the call from the second terminal to the third terminal. More particularly, the second terminal can receive communication from the first terminal and "tunnel" the communication to the third terminal. Similarly, the second terminal can receive communication from the third terminal and forward the communication to the first terminal via the call between the first and second terminals. When the communication session is a call, then, the second terminal can tunnel communication from the first terminal to the third terminal such that the third terminal effectively operates as a headset for the call between the first terminal and the second terminal.

The second terminal can interconnect the first and third terminals during the communication session in any of a number of different manners. For example, as shown in FIG. 8, consider the embodiment above where the short-range communication module(s) 80 of each of the second and third terminals 74, 76 include an RF module (e.g., RF module 60) and also include a Bluetooth module (e.g., Bluetooth module 64). In such an instance, the RF module (e.g., RF transponder tag) of the second terminal can store a Bluetooth identifier or other Bluetooth parameters required to establish Bluetooth communication with the Bluetooth module of the second terminal. In operation, then, the second terminal can select the third terminal to request that the third terminal be interconnected to the first terminal during a communication session between the first and second terminals. The third terminal then can initiate short-range (e.g., Bluetooth) communication with the second terminal, such as by requesting and thereafter receiving the Bluetooth identifier of the second terminal. Before initiating short-range communication, however, the third terminal, or more particularly the transfer agent 78 of the third terminal, can solicit an instruction from the third terminal user whether to accept or reject the request to interconnect the first and third terminals.

After the third terminal 76, or more particularly the transfer agent 78 of the third terminal, initiates short-range communication with the second terminal 74 (transfer agent of the second terminal), short-range communication can be established between the second and third terminals based upon the Bluetooth identifier of the second terminal. In this regard, a short-range communication link or "tunnel" can be established between the second and third terminals such that the third terminal is capable of effectively operating as a headset for the call between the first terminal 72 and the second terminal. Thus, during the call between the first and second terminals, communication from the first terminal can reach the second terminal, and be tunneled over to the third terminal. Likewise, communication from the third terminal can be tunneled to the second terminal, and then sent to the first terminal. Also, if so desired, voice communication that reaches the second terminal from the first terminal and/or the third terminal can be muted at the second terminal, thereby facilitating headset operation of the third terminal.

As explained above, the third terminal 76 can join a call between the first terminal 72 and the second terminal 74, or such a call can be transferred from the second terminal to the third terminal, based upon a second terminal identifier and/or a first terminal identifier. It should be understood, however, that the third terminal can join the call, or the call can be transferred to the third terminal, based upon any of a number of other identifiers capable of uniquely identifying the first terminal, second terminal and/or the call between the first and second terminals, if so desired. In such instances, the third terminal can be capable of receiving the other identifier(s) (e.g., call or communication session identifier, etc.) in a number of different manners, such as in the same manner the third terminal received the aforementioned identifiers of the first and/or second terminals.

According to one aspect of the present invention, all or a portion of the system of the present invention, such all or portions of the first terminal 72, second terminal 74 and/or third terminal 76, generally operates under control of a computer program product (e.g., transfer agent 78). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 5, 6, 7 and 8 are control flow diagrams of methods, systems and program products according to the invention. It will be understood that each block or step of the control flow diagrams, and combinations of blocks in the control flow diagrams, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the control flow diagrams. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the control flow diagrams. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the control flow diagrams.

Accordingly, blocks or steps of the control flow diagrams support combinations of means for performing the specified functions, combinations of steps for performing the specified functions and program instruction means for performing the specified functions. It will also be understood that each block or step of the control flow diagrams, and combinations of blocks or steps in the control flow diagrams, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
    a first terminal;
    a second terminal configured to engage in a communication session with the first terminal across at least one communication network; and
    a third terminal configured to communicate with the second terminal across a short-range communication link with the second terminal, the short-range communication link being effectuated by short-range RF modules of the second and third terminals,
    wherein the third terminal is configured to receive identifiers of the first and second terminals across the short-range communication link, and wherein the third terminal is configured to communicate with the at least one communication network based upon the identifiers of the first and second terminals to thereby join the third terminal in the communication session between the first and second terminals.

2. A system according to claim 1, wherein the third terminal is further configured to receive an identifier of the first terminal, and wherein the third terminal is configured to communicate the identifiers of the first and second terminals to the at least one communication network.

3. A system according to claim 1, wherein the second terminal is configured to communicate with the third terminal across a first short-range communication link between the second and third terminals, wherein one of the second terminal or the third terminal is configured to receive at least one parameter to establish a second short-range communication link between the second and third terminals, the at least one parameter being received across the first short-range communication link, wherein one of the second terminal or the third terminal is configured to establish a second short-range communication link between the second and third terminals based upon the at least one parameter, and wherein one of the second terminal or the third terminal is configured to receive the identifier of the other of the second terminal and the third terminal across the second short-range communication link.

4. A system according to claim 1, wherein the terminal receiving the identifier is pre-configured to perform an action with respect to the identifier, and wherein the terminal receiving the identifier is configured to communicate with the at least one communication network in accordance with the action.

5. A system according to claim 1, wherein the terminal receiving the identifier is further configured to receive an action to perform with respect to the identifier, the action having been dynamically-configured by one of the second terminal or the third terminal, and wherein the terminal receiving the identifier and the action is configured to communicate with the at least one communication network in accordance with the action.

6. A system according to claim 1, wherein the third terminal is configured to receive an identifier of the first terminal, the first terminal identifier being received from the second terminal across the short-range communication link, and wherein the third terminal is configured to communicate the first terminal identifier to the at least one communication network to thereby transfer the communication session from the second terminal to the third terminal.

7. A system according to claim 1, wherein the identifier comprises an identifier configured to identify the respective terminal to at least one of the communication networks.

8. A system according to claim 1, wherein at least one of the first terminal, second terminal or third terminal comprises a mobile telephone.

9. A system according to claim 1, wherein the identifier comprises an identifier of the communication session between the first terminal and the second terminal.

10. A system comprising:
a first terminal;
a second terminal configured to engage in a communication session with the first terminal across at least one communication network; and
a third terminal configured to communicate with the second terminal across a short-range communication link with the second terminal, wherein the second terminal is configured to interconnect the first terminal and the third terminal during the communication session such that the third terminal is configured to receive communication from the second terminal across the short-range communication link, the communication having been received at the second terminal from the first terminal across the at least one communication network, and such that the third terminal is configured to send communication to the second terminal across the short-range communication link, which the second terminal is configured to thereafter send to the first terminal across the at least one communication network, the third terminal otherwise being configured to engage the first terminal in a communication session independent of the second terminal.

11. An apparatus comprising:
a controller operable with a terminal and configured to operate a transfer agent, wherein the transfer agent is configured to communicate with a second terminal across a short-range communication link between the terminal and the second terminal, the second terminal being engaged in a communication session with a first terminal across at least one communication network, wherein the transfer agent is configured to receive identifiers of the first and second terminals across the short-range communication link, and thereafter communicate with the at least one communication network based upon the identifiers of the first and second terminals to thereby join the terminal in the communication session between the first and second terminals.

12. An apparatus according to claim 11, wherein the transfer agent is also configured to receive an identifier of the first terminal, and wherein the transfer agent is configured to communicate the identifiers of the first and second terminals to the at least one communication network to thereby join the terminal in the communication session between the first and second terminals.

13. An apparatus according to claim 11, wherein the transfer agent is further configured to communicate with the second terminal across a first short-range communication link with the second terminal, and thereafter receive at least one parameter to establish a second short-range communication link with the second terminal, the at least one parameter being received across the first short-range communication link, wherein the transfer agent is configured to establish a second short-range communication link with the second terminal based upon the at least one parameter, and wherein the transfer agent is configured to receive the second terminal identifier across the second short-range communication link.

14. An apparatus according to claim 11, wherein the transfer agent is pre-configured to perform an action with respect to the identifier, and wherein the transfer agent is configured to communicate with the at least one communication network in accordance with the action.

15. An apparatus according to claim 11, wherein the transfer agent is further configured to receive an action to perform with respect to the identifier, the action having been dynamically-configured by the second terminal, and wherein the transfer agent is configured to communicate with the at least one communication network in accordance with the action.

16. An apparatus according to claim 11, wherein the identifier received by the transfer agent comprises an identifier of the first terminal, and wherein the transfer agent is configured to communicate the first terminal identifier from the terminal to the at least one communication network to thereby transfer the communication session from the second terminal to the terminal.

17. An apparatus according to claim 11, wherein the identifier received by the transfer agent comprises an identifier configured to identify the second terminal to at least one of the communication networks.

18. An apparatus according to claim 11, wherein the terminal comprises a mobile telephone.

19. An apparatus according to claim 11, wherein the identifier received by the transfer agent comprises an identifier of the communication session between the first terminal and the second terminal.

20. An apparatus comprising:
a controller operable with a terminal and configured to communicate with a second terminal across a short-range communication link with the second terminal, the second terminal being engaged in a communication session with a first terminal across at least one communication network, wherein the second terminal is configured to interconnect the first terminal and the third terminal during the communication session such that the controller is configured to receive communication from the second terminal across the short-range communication link, the communication having been received at the second terminal from the first terminal across the at least one communication network, and such that the controller is configured to send communication to the second terminal across the short-range communication link, which the second terminal can thereafter send to the first terminal across the at least one communication network, the terminal otherwise being configured to engage the first terminal in a communication session independent of the second terminal.

21. A method comprising:
communication across short-range communication link between a third terminal and a second terminal, the short-range communication link being effectuated by short-range RF modules of the second and third terminals, the second terminal being engaged in a communication session with a first terminal across at least one communication network;
receiving identifiers of the first and second terminals at the third terminal across the short-range communication link; and
communicating the identifiers of the first and second terminals from the third terminal to the at least one communication network to thereby join the third terminal in the communication session between the first and second terminals.

22. A method according to claim 21, wherein receiving an identifier further comprises receiving an identifier of the first terminal at the third terminal, and wherein communicating with the at least one communication network comprises communicating the identifiers of the first and second terminals from the third terminal to the at least one communication network to thereby join the third terminal in the communication session between the first and second terminals.

23. A method according to claim 21 further comprising:
communicating across a first short-range communication link between the second and third terminals; and
receiving at least one parameter to establish a second short-range communication link between the second and third terminals, the at least one parameter being received across the first short-range communication link,
wherein communicating across a short-range communication link comprises establishing a second short-range communication link between the second and third terminals based upon the at least one parameter, and
wherein receiving an identifier comprises receiving an identifier of one of the second terminal or the third terminal across the second short-range communication link.

24. A method according to claim 21, wherein receiving an identifier comprises receiving an identifier at one of the second terminal or the third terminal, the terminal receiving the identifier being pre-configured to perform an action with respect to the identifier, and wherein communicating with the at least one communication network comprises communicating with the at least one network in accordance with the action.

25. A method according to claim 21, wherein receiving an identifier further comprises receiving an action to perform with respect to the identifier, the action having been dynamically-configured by one of the second terminal or the third terminal, and wherein communicating with the at least one communication network comprises communicating with the at least one network in accordance with the action.

26. A method according to claim 21, wherein receiving an identifier comprises receiving an identifier of the first terminal at the third terminal, the first terminal identifier being received from the second terminal across the short-range communication link, and
wherein communicating with the at least one communication network comprises communicating the first terminal identifier from the third terminal to the at least one communication network to thereby transfer the communication session from the second terminal to the third terminal.

27. A method according to claim 21, wherein receiving an identifier comprises receiving an identifier configured to identify the respective terminal to at least one of the communication networks.

28. A method according to claim 21, wherein communicating across a short-range communication link between a third terminal and a second terminal comprises communicating across a short-range communication link between a third terminal and a second terminal at least one of which comprises a mobile telephone.

29. A method according to claim 21, wherein receiving an identifier comprises receiving an identifier of the communication session between the first terminal and the second terminal.

30. A method comprising:
communicating across a short-range communication link between a third terminal and a second terminal, the second terminal being engaged in a communication session with a first terminal across at least one communication network; and
interconnecting the first terminal and the third terminal during the communication session, the third terminal otherwise being configured to engage the first terminal in a communication session independent of the second terminal, wherein interconnecting the first and third terminals comprises:
receiving communication at the third terminal from the second terminal across the short-range communication link, the communication having been received at the second terminal from the first terminal across the at least one communication network; and
sending communication to the second terminal from the third terminal across the short-range communication link such that the second terminal can thereafter send the communication to the first terminal across the at least one communication network.

31. A computer program product comprising at least one computer-readable storage medium having computer-readable program code portions stored therein, the computer-readable program code portions comprising:
a first executable portion configured to communicate across a short-range communication link between a third terminal and a second terminal, the short-range communication link being effectuated by short-range RF modules of the second terminal and the third terminal, the second terminal being engaged in a communication session with a first terminal across at least one communication network;
a second executable portion configured to receive identifiers of the first and second terminals at the third terminal across the short-range communication link; and
a third executable portion configured to communicate from the third terminal to the at least one communication network the identifiers of the first and second terminals to thereby join the third terminal in the communication session between the first and second terminals.

32. A computer program product according to claim 31, wherein the second executable portion is further configured to receive an identifier of the first terminal, and wherein the third executable portion is configured to communicate the identifiers of the first and second terminals from the third terminal to the at least one communication network to thereby join the third terminal in the communication session between the first and second terminals.

33. A computer program product according to claim 31 further comprising:
a fourth executable portion configured to communicate across a first short-range communication link between the second and third terminals; and
a fifth executable portion configured to receive at least one parameter to establish a second short-range communication link between the second and third terminals, the at least one parameter being received across the first short-range communication link,
wherein the first executable portion is configured to establish a second short-range communication link between the second and third terminals based upon the at least one parameter, and
wherein the second executable portion is configured to receive an identifier of one of the second terminal or the third terminal across the second short-range communication link.

34. A computer program product according to claim 31 configured to operate on one of the second terminal or the third terminal pre-configured to perform an action with respect to the identifier, and wherein the third executable portion is configured to communicate with the at least one communication network in accordance with the action.

35. A computer program product according to claim 31, wherein the second executable portion is further configured to receive an action to perform with respect to the identifier, the action having been dynamically-configured by one of the second terminal or the third terminal, and wherein the third executable portion is configured to communicate with the at least one communication network in accordance with the action.

36. A computer program product according to claim 31, wherein the second executable portion is configured to receive an identifier of the first terminal, the first terminal identifier being received from the second terminal across the short-range communication link, and wherein the third executable portion is configured to communicate the first terminal identifier from the third terminal to the at least one communication network to thereby transfer the communication session from the second terminal to the third terminal.

37. A computer program product according to claim 31, wherein the second executable portion is configured to receive an identifier configured to identify the respective terminal to at least one of the communication networks.

38. A computer program product according to claim 31, wherein the first executable portion is configured to communicate across a short-range communication link between a third terminal and a second terminal at least one of which comprises a mobile telephone.

39. A computer program product according to claim 31, wherein the second executable portion is configured to receive an identifier of the communication session between the first terminal and the second terminal.

40. A computer program product comprising at least one computer-readable storage medium having computer-readable program code portions stored therein, the computer-readable program code portions comprising:

a first executable portion configured to communicate across a short-range communication link between a third terminal and a second terminal, the second terminal being engaged in a communication session with a first terminal across at least one communication network; and a second executable portion configured to interconnect the first terminal and the third terminal during the communication session, the third terminal otherwise being configured to engage the first terminal in a communication session independent of the second terminal, wherein the second executable portion being configured to interconnect the first and third terminals includes being configured to:

receive communication at the third terminal from the second terminal across the short-range communication link, the communication having been received at the second terminal from the first terminal across the at least one communication network; and send communication to the second terminal from the third terminal across the short-range communication link such that the second terminal can thereafter send the communication to the first terminal across the at least one communication network.

\* \* \* \* \*

UNITED STATES PATENT AND TRADEMARK OFFICE
CERTIFICATE OF CORRECTION

| | |
|---|---|
| PATENT NO. | : 7,447,513 B2 |
| APPLICATION NO. | : 10/924316 |
| DATED | : November 4, 2008 |
| INVENTOR(S) | : Anttila et al. |

Page 1 of 1

It is certified that error appears in the above-identified patent and that said Letters Patent is hereby corrected as shown below:

<u>Column 20,</u> (First occurrence)

Line 49, "communication" should read --communicating-- and after "across" insert --a--.

Signed and Sealed this

Tenth Day of February, 2009

JOHN DOLL
*Acting Director of the United States Patent and Trademark Office*